Patented Dec. 23, 1952

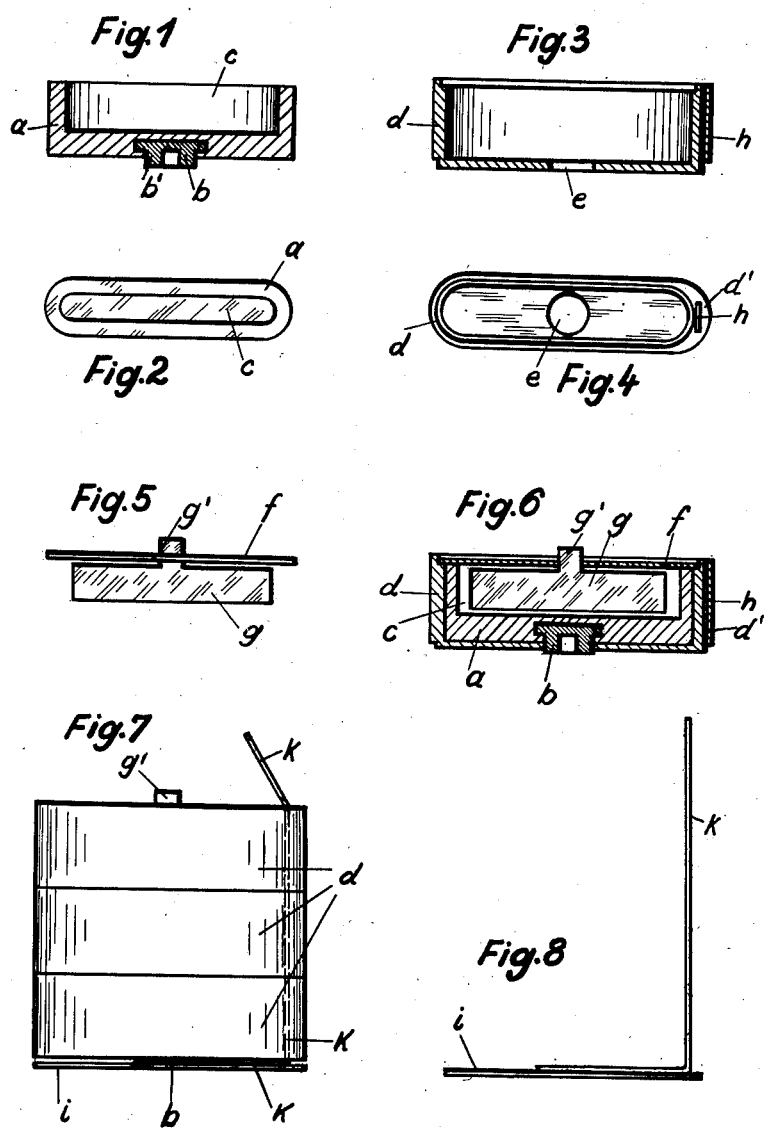

2,623,082

UNITED STATES PATENT OFFICE 2,623,082

DRY CELL AND DRY BATTERY PRODUCED THEREOF

Leopold Hoke, St. Andra Wordern, Austria

Application February 26, 1948, Serial No. 11,065
In Germany August 11, 1943

Section 1, Public Law 690, August 8, 1946
Patent expires August 11, 1963

4 Claims. (Cl. 136—111)

My invention relates to a dry cell, in particular a Leclanché-cell, and its production.

It is the main object of my invention to provide a dry cell particularly adapted to produce therewith dry batteries.

It is a further object of my invention to simplify the production of those cells.

It is a still further object of my invention to provide a dry battery composed of such cells which allows an increase of the output energy at a given size size of the battery as well as a prolongation of the duration of the battery compared with batteries of the type hitherto known.

It is a well-known fact that dry cells essentially consist of the positive carbon electrode, the depolarizing mass, the electrolyte, and the negative electrode, i. e. the zinc-pole. Cells are almost exclusively produced in the manner that the depolarizing mass is pressed round a carbon rod carrying a cap of brass, and the mass is covered with canvas. This carbon rod and depolarizing mass covered with material is then placed into a zinc-can of somewhat larger volume, the free space is filled with electrolyte, the cell is covered with a disk and closed by pouring a molten sealing mass in the cover. The cells produced in this way are then, according to the purpose of their use, united in groups by soldering, and finally provided with a cover enclosing them.

The production of cells is very complicated. A great number of individual parts that have to be cut out separately are needed, and putting them together requires extensive work. So it has been suggested to construct cells in the reverse order, i. e. to place the positive carbon pole and the depolarizing mass outside and put the electrolyte as well as the zinc-pole within. Such positive electrodes and depolarizing bodies are produced in the manner that first of all a damp mass consisting of manganese dioxide, graphite and some liquid electrolyte is prepared which then is pressed into a cover of insulating soaked paper. The cell is closed thereupon by means of a lid. Even though the reverse construction of cells allows substantial saving of material if compared with the generally employed way of production with the use of zinc-cans, yet the way of executing these cells as it has been known hitherto has not stood the test in practice, as the shape is that of a cup, which renders production more difficult, and the electrolyte dries up in a short time in consequence of lacking tightness of the paper-cover, which results in the cell not producing any current.

According to my invention the cell is produced in the shape of a mould or trough. The cell having the positive electrode and the depolarizing mass arranged outside and the negative electrode within according to my invention is produced in the following manner:

The depolarizing mass, at the same time the positive pole, is moulded in the shape of a cup or mould. After having been moulded it is placed into the separately made insulating casing of water-repelling plastics, or the depolarizing mass is filled into the separately produced moulded case possessing the shape of a mould and is punched with a punching-die. The punching die, working like a wedge, produces a hollow space for the electrolyte and the zinc pole in the moulded body at the same time. By arranging the electrode and depolarizing mass outside as well as by saving of space on account of zinc-can, carbon-rod, muslin, thread and insulating parts not being used, application of a larger quantity of depolarizing mass is made possible, by which the working period of the cell is prolonged. This arrangement has the advantage that destruction of the outer part of the cell by the electrolyte is not possible, thus soaking of the cells and destruction of the case of the battery is avoided. Conduction of current can take place in the usual way by means of a carbon foil pressed in at the same time with the moulding process for the carbon foil to be pressed in a blank is provided at the bottom of the moulded case in the axis of the disk. Conduction of the current may be also effected by some plastic material, as is generally known, consisting for instance of pressed carbon or graphite to which some water-repelling substance e. g. paraffin, ozocerite, or the like, is added. But according to my invention the plastic material is used directly as a current-collector. The zinc pole according to the invention is pressed in at the production of the tight-closing cover-plate consisting likewise of plastic material in the axis of the disk. This is done in the manner that part of the zinc pole projects above the cover-plate and is formed as a gliding-contact for collecting of current. The cells are constructed in a simple longer way, by squeezing in the cover-plate with the zinc-electrode into the case produced by moulding after the ready electrolyte has been filled into the moulded body.

The cell may be also executed in such a way that water has to be filled into it to make it ready for use. The arrangement of the electrodes in the axis of the disk in the bottom and the cover-plate make it possible without soldering by merely putting the cells one upon another to compound normal batteries, anode-batteries, as well as batteries for special purposes of the desired voltage and amperage. By this construction of the cell it is easily possible also to exchange worn out cell. It is known that batteries are produced the individual cells of which can be exchanged; but this is made possible only by addition of various small components to the ready zinc cell, or by specially produced cases.

The drawings represents a cell according to invention and its construction in one way of embodiment.

Fig. 1 shows the moulded body in cross-section, while

Fig. 2 is a plan view from above of the moulded body shown in Fig. 1;

Figs. 3 and 4 show in a longitudinal section and in a plan view from above the insulating casing;

Fig. 5 is a side view of the cover plate and a zinc electrode;

Fig. 6 shows the assembled cell in cross section;

Fig. 7 shows in a front elevation a battery composed of a number of cells of the kind shown in Fig. 6; and Fig. 8 shows separately a contact strip forming part of the arrangement of Fig. 7.

In the drawing, $a$ denotes a body in the shape of a flat trough pressed from a substance which is composed of depolarizing mass and electrolyte and which, after having been pressed will retain permanently the shape into which it was pressed. The depolarizing body $a$ has embedded in its bottom a contact member $b$ and forms a cavity $c$. The contact member $b$ which is made of carbon and forms the positive terminal of the cell has a downwardly extending portion $b'$. A liquid-tight insulating case or shell $d$ which may be made of Bakelite, polystyrene, polyvinylchloride, or any other water repellent plastic, is shaped so as to closely surround the body $a$. The case $d$ has a body opening $e$ through which the downwardly extending portion $b'$ of the contact member $b$ may extend, and a lateral extension $d'$ through the whole height of which a slot $h$ is provided. The body $a$ surrounds at a distance a zinc electrode carried by a cover plate $f$, which is made of liquid-tight material, e. g., of the same material as the case $d$. The zinc electrode $g$ has an upper extension $g'$ which extends through a central opening of the cover plate $f$. To the extent as the cavity $c$ in the body $a$ is not taken up by the zinc electrode $g$ this cavity is filled with electrolyte, which may be of liquid or of paste-like consistency. In the latter case the electrolyte is filled into the cavity $c$ before the cover plate $f$ is put in place, whereas in the former case the electrolyte may be supplied through a closable opening in the cover $f$ (not shown). After the cover plate has been put in place on the shell or case $d$ the edges of both parts of the casing are sealed off in the manner usual with dry cells.

The flashlight battery shown in Fig. 7 is formed by placing three cells of the kind shown in Fig. 6 one upon another. A contact strip $k$ secured to an insulating bottom plate $i$ is provided for establishing contact with the extension $b'$ of the contact member $b$ of the lowermost of the three cells. A vertical arm of the contact strip $k$ is passed through the slots $h$ in the lateral extensions $d'$ of all the three casings $d$, being thereby protected against contact with the outer metal case which is ordinarily used for flashlights but is not shown in the drawing.

The complete individual cell consists of three parts each of which can be made in an economical way by production in bulk. The tolerances can be kept within such limits that easy construction of the cell is possible.

From the foregoing description, it will be clear to those skilled in the art that the cell structure as well as the structure of the battery composed of such cells may be changed in many ways without departing from the principles of my invention. It is to be understood, therefore, that the embodiments of the invention described and shown are given by way of illustration only and not as a limitation of the scope of my invention.

I claim:

1. A Leclanché dry cell, comprising a preformed body permanent as to form in the shape of an oblong tray composed of a mixture of depolarizing mass and electrolyte, a button-shaped carbon electrode embedded in the lower portion of the bottom of said tray-shaped depolarizer body and extending through and below said lower portion of said bottom, a zinc electrode within the oblong cavity of said tray-shaped depolarizer body the cross section of said zinc electrode being smaller than the cross section of said oblong cavity, the portion of said cavity unoccupied by said zinc electrode being occupied by electrolyte.

2. A Leclanché dry cell, comprising a preformed bowy permanent as to form in the shape of an oblong tray composed of a mixture of depolarizing mass and electrolyte, a button-shaped carbon electrode embedded in the lower portion of the bottom of said tray-shaped depolarizer body so as to extend through and below said lower portion of said bottom, a zinc electrode within the oblong cavity of said tray-shaped depolarizer body the cross section of said zinc electrode being smaller than the cross section of said oblong cavity, the portion of said cavity unoccupied by said zinc electrode being occupied by electrolyte, and a liquidtight shell of insulating material closely surrounding said tray-shaped depolarizer body and having an opening for the passage of the part of said carbon button extending below said bottom.

3. A Leclanché dry cell, comprising a preformed body permanent as to form in the shape of an oblong tray composed of a mixture of depolarizing mass and electrolyte, a button-shaped carbon electrode embedded in the lower portion of the bottom of said tray-shaped depolarizer body so as to extend through and below said lower portion of said bottom, a zinc electrode within the oblong cavity of said tray-shaped depolarizer body the cross section of said zinc electrode being smaller than the cross section of said oblong cavity, the portion of said cavity unoccupied by said zinc electrode being occupied by electrolyte, and a liquidtight shell of insulating material closely surrounding said tray-shaped depolarizer body, said shell having an opening for the passage of the part of said carbon button which extends below said bottom and having further a lateral extension and a passageway extending through the whole height of said lateral extension so as to permit the passage through said passageway of an elongated contact element.

4. A Leclanché dry cell, comprising a preformed body permanent as to form in the shape of an oblong tray composed of a mixture of de-- polarizing mass and electrolyte, a button-shaped carbon electrode partly embedded in the lower portion of the bottom of said tray-shaped depolarizer body so as to extend through and below said lower portion of said bottom, a zinc electrode within the oblong cavity of said tray-shaped depolarizer body the cross section of said zinc electrode being smaller than the cross section of said oblong cavity, the portion of said cavity unoccupied by said zinc electrode being occupied by electrolyte, a liquidtight shell of insulating material closely surrounding said tray-shaped depolarizer body, said shell having a bottom and a side wall, an opening in said shell bottom for the passage of the part of said carbon button which extends below said bottom of said depolarizer body, said side wall of said shell having a lateral extension so that at this point said side wall is of larger cross-section than elsewhere, and a passageway extending through the whole height of said lateral extension, so as to permit the passage through said passageway of an elongated contact element.

LEOPOLD HOKE.

REFERENCES CITED

The following references are of record in the file of this patent:

UNITED STATES PATENTS

| Number | Name | Date |
|---|---|---|
| 510,899 | Cutten | Dec. 19, 1893 |
| 1,161,668 | Heinrich et al. | Nov. 23, 1915 |
| 1,464,573 | Heise et al. | Aug. 14, 1923 |
| 1,624,409 | Heise et al. | Apr. 12, 1927 |
| 2,095,421 | Ruhoff et al. | Oct. 12, 1937 |
| 2,200,862 | Redfern | May 14, 1940 |
| 2,418,442 | Wienckse | Apr. 1, 1947 |
| 2,424,149 | Chaplin | July 15, 1947 |

FOREIGN PATENTS

| Number | Country | Date |
|---|---|---|
| 18,570 | Great Britain | 1896 |
| 90,160 | Switzerland | Aug. 1, 1921 |
| 100,086 | Great Britain | Mar. 16, 1916 |
| 263,116 | Switzerland | Nov. 1, 1949 |
| 487,294 | Great Britain | June 17, 1938 |
| 530,859 | Great Britain | Dec. 23, 1940 |